United States Patent
Bean

[15] 3,681,707
[45] Aug. 1, 1972

[54] DIGITAL ADF TUNING INDICATOR

[72] Inventor: Stephen F. Bean, Columbus, Ohio

[73] Assignee: Autech Corporation, Columbus, Ohio

[22] Filed: April 27, 1971

[21] Appl. No.: 137,754

[52] U.S. Cl..............331/64, 324/79 D, 325/325, 325/364, 325/455, 343/113
[51] Int. Cl................................G01s 5/02
[58] Field of Search........325/325, 364, 455; 331/64, 331/44; 343/113; 324/79 D

[56] References Cited

UNITED STATES PATENTS 3,060,427  11/1962  Jaffe et al. .................343/118
3,244,983  4/1966  Ertman........................331/64

*Primary Examiner*—John Kominski
*Attorney*—Le Blanc & Shur

[57] ABSTRACT

Disclosed is a digital tuning indicator for an automatic direction finder (ADF) equipment used in aircraft comprising a counter to measure the ADF local oscillator frequency, off-set logic modify the measured count to reflect the intermediate frequency representing the difference between the local oscillator frequency and the desired incoming frequency, and a digital display to provide an exact indication of the frequency of the incoming station to which the system is tuned. The off-set logic operates by resetting the counter when it reaches a count equal to the intermediate frequency thereby subtracting this value from the total count accumulated during each operating cycle. Control of the foregoing is provided by a timing generator or programmer which establishes the counting and data display intervals.

15 Claims, 5 Drawing Figures

DIGITAL ADF TUNING INDICATOR

INTRODUCTION AND BACKGROUND

The present invention relates to a tuning indicator for an automatic direction finder (ADF) radio system which permits exact, convenient and rapid tuning of the system to a desired reference transmitter.

As is known, an ADF is an airborne device used to determine the bearing of an aircraft with respect to the position of a ground based transmitter. Such transmitters, known as non-directional beacons (NDB's) are specially erected at locations throughout the country. The exact location and operating frequencies (usually between approximately 200 KHz and 400 KHz) are published and available for use by all airmen. In addition, any continuous wave transmitter such as a standard AM radio station can be employed as a reference for ADF operation as long as the location and operating frequency are known.

Briefly stated, an ADF comprises an airborne receiver having a suitable RF front end, local oscillator, mixer, and IF processing circuitry to receive continuous wave broadcasts in a low frequency band extending from somewhat below to just above the standard AM broadcasting bands. The incoming signal is received by a non-directional antenna, sometimes called the sense antenna, and by a directional loop antenna, and is heterodyned in conventional fashion to derive an IF signal, customarily at a frequency of 142.5 KHz.

The IF signal is further processed to control the positioning of the directional loop antenna to a desired orientation in relation to the source of the received signal. A meter or other suitable indicator is coupled to the loop antenna positioning apparatus to provide a bearing measurement in terms of the loop antenna orientation. Usually audio demodulation and amplification equipment and a speaker are also provided to permit use of the system as a communication receiver.

Operation of an ADF depends very largely on accurate tuning to the frequency of the NDB or commercial radio station being employed as a reference. Needless to say, both the quality of the equipment as well as the attention and skill of the operator are significant factors. Regarding the latter, currently available ADF equipment usually satisfies the requirement for accurate and stable tuning capability. However, prevailing techniques for utilizing available tuning capabilities are not completely satisfactory.

For example, as mentioned above, the range of frequencies employed for ADF operation extends from approximately 200 KHz to 2,000 KHz. Tuning is usually accomplished by a knob and associated tuning dial. However, since frequency assignments are made on integral multiples of 10 KHz in the broadcast band, and for multiples of 1 KHz below the broadcast band, exact tuning would require four figure accuracy. Thus, many hundreds of separate indicia would be required on the dial. Also, a detent corresponding to each indicium would be required. This is obviously impractical, and thus on heretofore available equipment, there is usually provided a scale graduated in units of, for example, 20 KHz, and a signal strength meter by which the tuning operation is accomplished. This has obvious disadvantages both in convenience and accuracy. Also, such an arrangement is necessarily dependent upon the incoming signal for the required indication of signal strength, and thus the receiver can not be tuned unless the aircraft is within range of the transmitter.

The foregoing disadvantages are overcome in accordance with the present invention by employment of a digital tuning system which measures only the frequency of the local oscillator. This frequency, which, for various reasons, is always above the desired incoming frequency by an off-set equal to the IF, is corrected to reflect the IF off-set and thereafter displayed in digital form. The result is an exact indication of the frequency to which the system is tuned, displayed to four-place accuracy.

The invention allows rapid and accurate tuning simply by adjusting the tuning knob until the desired transmitter frequency is displayed. Moreover, because the tuning operation is totally independent of the received signal, the receiver may be tuned well in advance of entry into the range of the transmitter. This capability is particularly advantageous since it permits the pilot to tune to an outer marker or LF beacon in preparation for a landing long before becoming involved in the details of the approach, thereby freeing the pilot of the need to execute this operation while otherwise intensively occupied.

It should be noted, that other digital tuning indicating equipment is known for various purposes, however, such equipment is not compatible with conventional ADF equipment, so far as applicant is aware.

Accordingly, it is an object of the present invention to provide an improved tuning indicator system for an ADF system.

Another object of this invention is to provide an ADF tuning indicator which is convenient and simple yet provides the user with an exact indication of the frequency to which the ADF is tuned.

It is also an object of this invention to provide a tuning indicator for an ADF permitting pretuning to the frequency of an outer marker or LF beacon in preparation for landing long before becoming involved in the details of the approach.

Yet another object of this invention is to provide a tuning indicator for an ADF in which the exact frequency to which the system is tuned is displayed digitally with four-place accuracy. A related object is to provide such a four-place digital display by means of seven-segment light emitting diode arrays.

It is also an object of this invention to provide a tuning indicator for an ADF in which the local oscillator frequency is measured, and a correction applied to reflect the intermediate frequency off-set prior to display.

Another object of this invention is to provide a tuning indicator system for an ADF comprising means to establish an operating cycle including a count period and a display period, a counter responsive to the actual local oscillator frequency, off-set logic to reset the counter during the count period when a count representing the IF off-set has been accumulated, and means to display the count at the end of the measuring time frame representative of the actual frequency to which the ADF receiver has been tuned.

The exact nature of this invention as well as other objects and advantages thereof will become apparent from consideration of the following detailed description, and the accompanying drawing, in which:

FIG. 4 is a timing diagram pertinent to the operation of the system of FIGS. 2 and 3; and FIG. 5 is a schematic representation of a preferred form of display element employed in accordance with the system of FIGS. 2 and 3.

Figure 1:
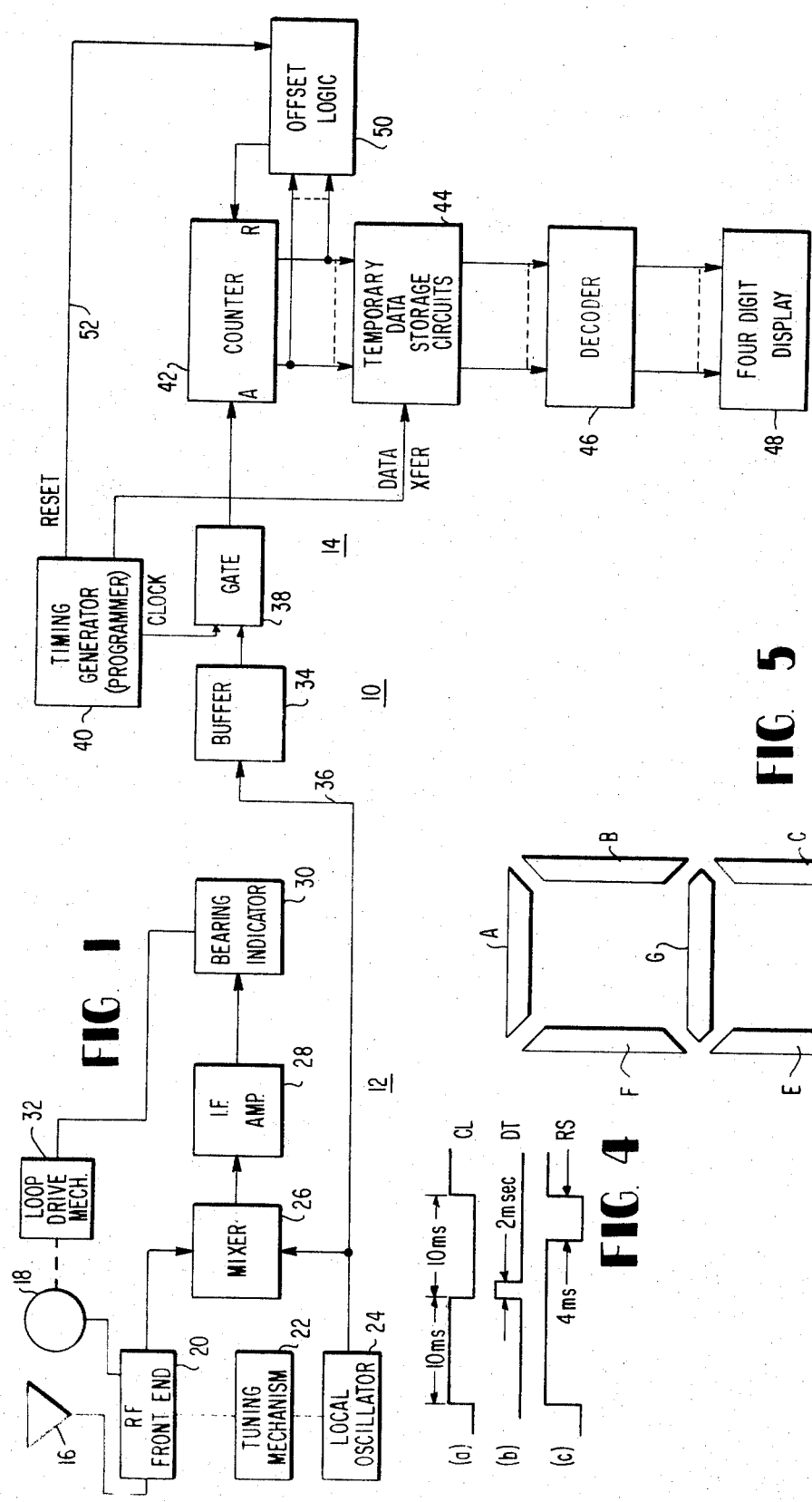
FIG. 1 is an overall block diagram of an ADF incorporating the tuning indicator system according to this invention.

Turning first to FIG. 1, an overall block diagram of an ADF incorporating the system of the present invention is shown, generally denoted at 10. The system comprises an ADF subsystem 12, and the digital tuning indicator subsystem 14.

ADF subsystem 12 is constructed in a generally conventional manner, including a non-directional sense antenna 16, and a directional loop antenna 18, both connected to an RF front end 20, tunable in conventional fashion by a mechanical tuning mechanism 22. The latter adjusts the frequency of the tuned RF circuits, and also controls the operating frequency of a local oscillator 24. Both RF front end 20 and local oscillator 24 are connected to a mixer 26 which converts the incoming RF signal to a signal at the desired intermediate frequency, usually 142.5 KHz.

The output of mixer 26 is coupled through an IF amplifier 28 of any suitable construction to the bearing indicator portion of the system, denoted 30. The latter includes the various signal processing and control circuits conventionally employed in ADF systems and provides actuation for a loop drive mechanism 32 which orients directional loop antenna 18. Also included in bearing indicator unit 30 is a suitable meter or other bearing display, as well as audio demodulation and amplification equipment, if desired, to permit use of the system as a communication receiver.

For use by tuning indicator subsystem 14, the output of local oscillator 24 is provided over lead 36 through a buffer circuit 34 as the signal input to a control gate 38. Operation of gate 38 is controlled by a clock signal for timing generator (programmer) unit 40 which establishes count and display periods as hereinafter explained.

The output of gate 38 is provided to the advance input of a counter 42 which records the number of cycles of the local oscillator output over a predetermined counting interval. Signals representing the count state are provided through a series of temporary data storage circuits, generally denoted 44, to a decoder 36 which operates four digit display unit 48.

Outputs of counter 42 are also provided to an off-set logic unit 50. The latter responds to accumulation of a count during the initial portion of a counting time frame equal to the intermediate frequency (142.5 KHz) to reset counter 42 to zero. A control signal for logic unit 50 is provided over lead 52 by the reset output of timing generator 40 as hereinafter described.

Figure 2:
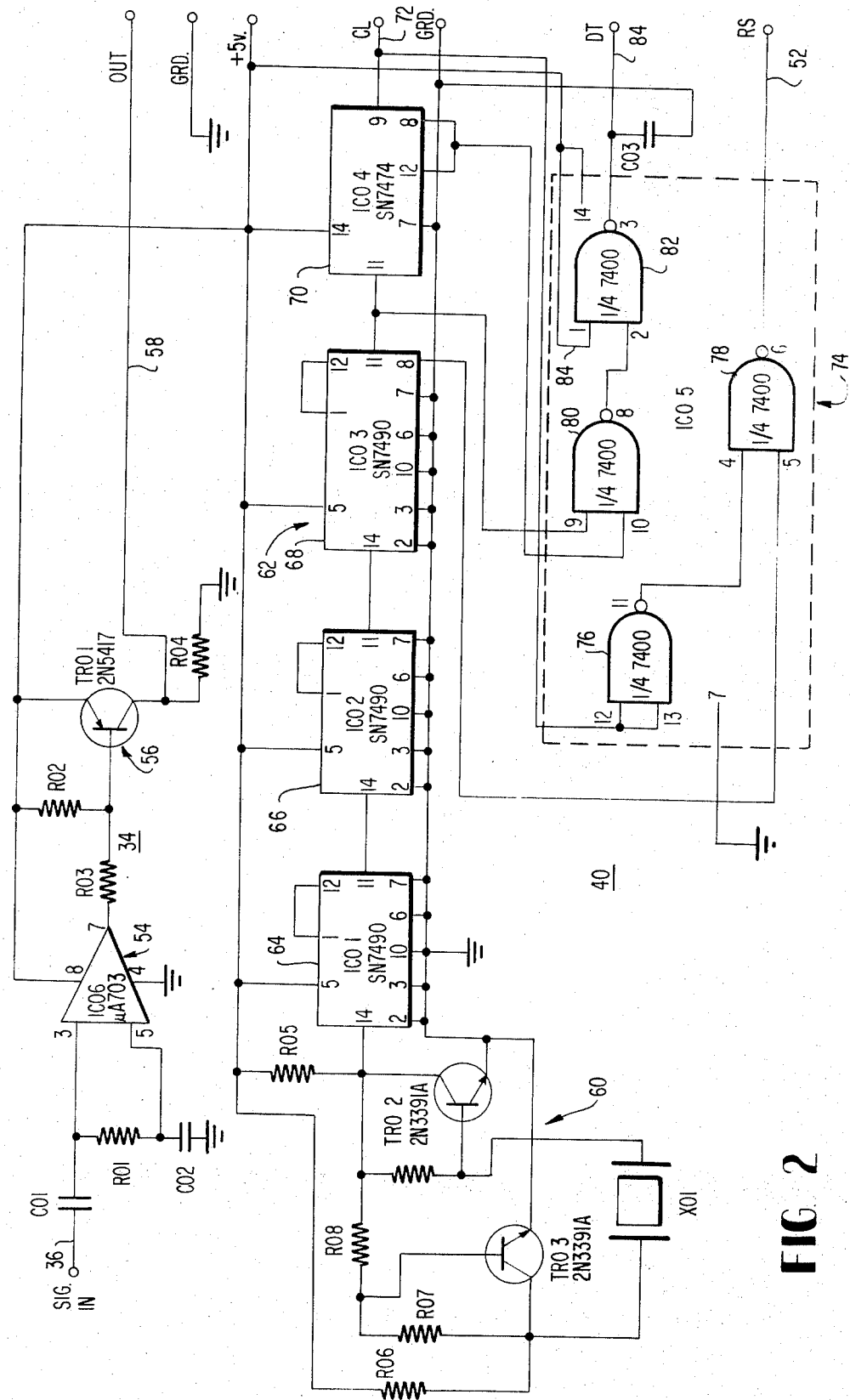
FIGS. 2 and 3 are detailed circuit diagrams of a preferred embodiment of the tuning indicator portion of the system in FIG. 1.
Figure 3:
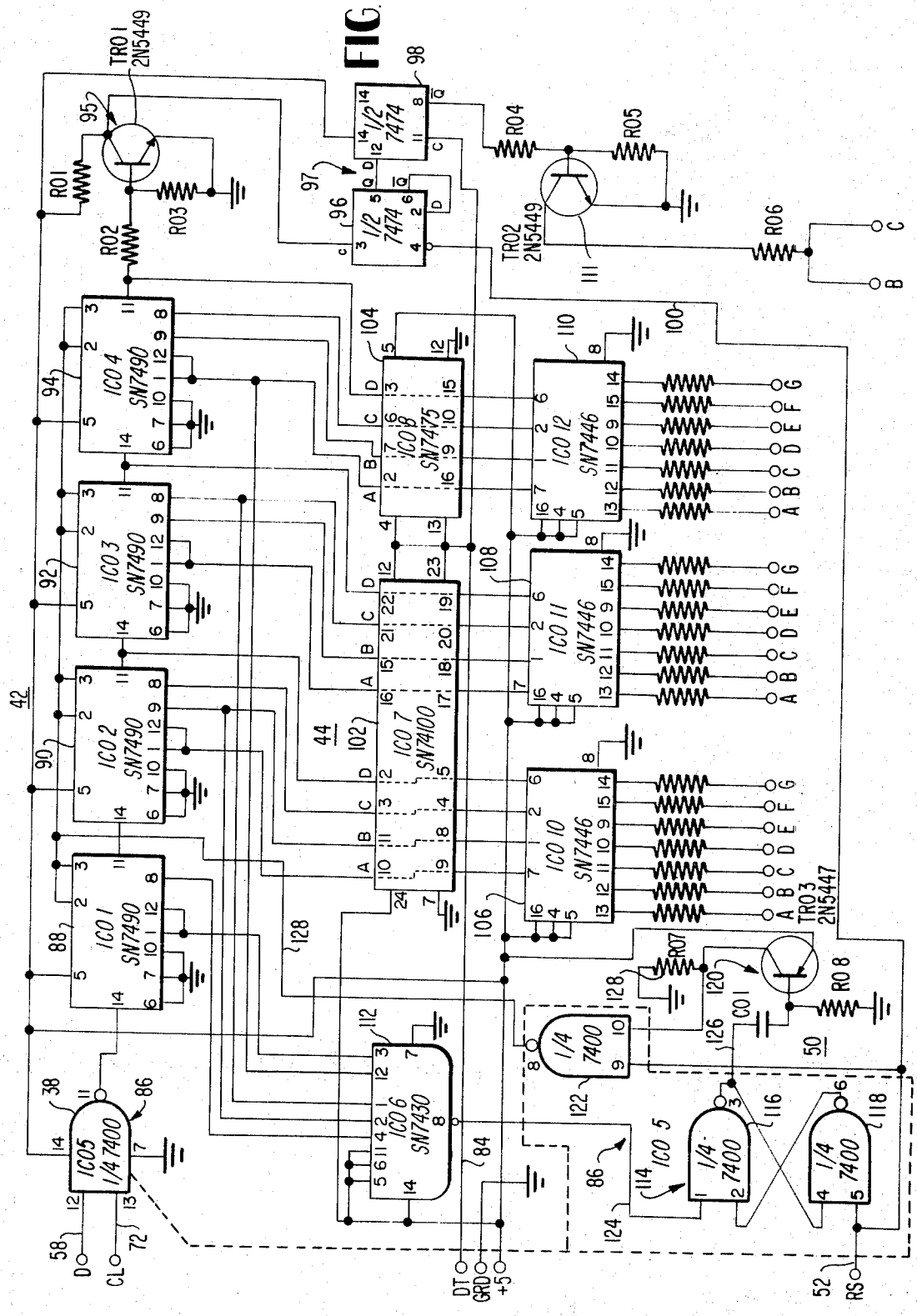

FIGS. 2 and 3 comprise a preferred embodiment of the tuning indicator subsystem 14 described above in connection with FIG. 1. The system preferably is constructed of commercially available discrete circuit elements and integrated circuits, such as TTL logic circuits manufactured by Texas Instruments, Inc., of Dallas, Tex.

With reference to FIG. 2, there is shown buffer circuit 34 and timing generator unit 40. The former is comprised of a dual input RF–IF, amplifier 54, type µ4703, manufactured by Fairchild Semiconductor of Mountain View, Calif. A transistor amplifier 56, operating as a limiter converts the sinusoidal output of the local oscillator to a squarewave. The resulting squarewave is coupled over lead 58 to control gate 38 as hereinafter described.

Timing generator 40 comprises a crystal controlled oscillator 60 of any suitable or desired construction, preferably operating at 100 KHz as explained below. A four-stage counter 62 comprised of 3 decade counters 64, 66, and 68, and a binary counter 70 is connected to oscillator 60. Decade counters 64 through 68 are preferably Texas Instruments type SN–7490 connected to operate in 8421 binary coded decimal format. The input to counter stage 64 is provided at its clock input (terminal 14) by the output of oscillator 60. The output, at terminal 11, representing the "8" code element in the binary coded decimal format is coupled to the clock input (terminal 14) of counter stage 66. Similarly, the "8" outputs of stages 66 and 68 are connected respectively to the clock inputs of counter stages 68 and 70 (terminals 14 and 11, respectively.)

Counter stage 70 is preferably a type D flip-flop such as Texas Instruments SN–7474 connected for what is usually termed toggling operation in which alternate clock inputs at terminal 11 reverse the flip-flop Q and $\overline{Q}$ outputs at terminals 9, and 8, respectively. The Q output at terminal 9 represents the clock output of timing generator 40 (see FIG. 1) and is provided over lead 72 as the control input to gate 38 as hereinafter described.

For the above-mentioned operating frequency of 100 KHz, counter stage 64 provides a pulse output at terminal 11 at a repetition frequency of 10 KHz, counter stage 66 provides an output at a repetition frequency of 1 KHz, counter stage 68 provides an output at a repetition frequency of 100 KHz, and binary stage 70 provides an output at a repetition frequency of 50 KHz. Since terminal 11 provides the "8" output in the 8421 BCD format, an output signal is present during the eighth and ninth counts of the ten count operating cycle for each of stages 64 – 70, the duration being twice the input repetition period for the input to the respective stage. Clock operation at terminal 14 is such that the circuit changes state at the high to low transition. Thus a succeeding stage advances at the end of the 9th count of the preceding stage as is required for decimal counting. Binary counter stage 70 triggers on a high to low transition. Thus, the half cycles of the output of binary stage 70 commence at the 8th count of successive operating cycles of counter stage 68.

Timing generator 40 also includes a logic circuit generally designated 74 which operates to generate the data transfer (DT) and reset (RS) outputs of timing generator 40. These outputs are shown in FIG. 4 in which line (a) represents a complete cycle of the clock pulse, line (b) represents the associated data transfer pulse, and line (c) represents the reset signal. As is illustrated, each half cycle of the clock pulse (50 Hz) occupies 10 milliseconds. The data transfer pulse is high during the first 2 milliseconds of the low half cycle of the clock pulse. The reset pulse is high during the entire first half cycle of the clock pulse and for the first 6 milliseconds of the second half cycle and is low for the remaining 4 milliseconds of the clock pulse cycle.

The circuitry for generating the above described data transfer and reset pulses comprises four NAND gates 76, 78, 80 and 82, which are preferably four portions of a Texas Instruments type SN–7400 quadruple 2-input positive NAND gate. The reset signal (line (c) FIG. 4) is generated by NAND gates 76 and 78. Both inputs of stage 76 are connected to the clock signal output of binary stage 70. Thus, NAND gate 76 operates as an inverter with its output at terminal 11 being low during the initial half cycle of the clock signal and being high during the second half cycle.

The output of NAND gate 76 is connected as one input to NAND gate 78, the other input to which is provided by the "4" output of counting stage 68. The latter signal is high during the 4th through 7th counts of the operating cycle of counter stage 68 while the output of NAND gate 76 is high only during the second half cycle of the clock signal. Thus, NAND gate 78 is activated and its output is low only during the 4th through 7th counts of stage 68 during the second half cycle of the output of stage 70.

Since each half cycle of stage 70 commences with the 8th count of stage 68, it may be seen that NAND gate 78 is activated only during the last four counts of the low half cycle of the clock pulse. The reset signal RS is thus low only during that period as indicated by waveform (c) of FIG. 4. As mentioned, the input frequency for stage 68 is 1 KHz. Thus, with NAND circuit 78 actuated for four of the ten counting states of stage 68, the duration of the reset pulse is 4 milliseconds, with a repetition period of 20 milliseconds.

The data transfer pulse is generated by NAND circuits 80 and 82. The former receives as its inputs, the "8" output of 8421 BCD decade stage 68, and the complement output of binary stage 70. NAND circuit 80 is therefore activated and its output is low only during the 8th and 9th counts of the 10 count cycle of stage 68. Since the input repetition period for stage 68 is 1 millisecond, this corresponds to the first 2 milliseconds of each half cycle of the clock signal (line a of FIG. 4.) Since NAND circuit 80 is triggered only during the second half cycle of the clock signal, its output at terminal 8 is low only during the first 2 milliseconds of this half cycle.

NAND circuit 82, which receives one input from a continuously high level over lead 84 and the other input from the output of NAND circuit 80 operates as an inverter and thus the data transfer signal appearing on lead 84 is a positive pulse during the first 2 milliseconds of each second half cycle of the clock pulse as illustrated by waveform b of FIG. 4.

Turning now to FIG. 3, there is shown the remainder of the tuning indicator subsystem 14 including gate circuit 38, counter 42, data transfer gates 44, decoder 46, off-set logic circuit 50 and the inputs to display unit 48.

As illustrated, the data input from buffer 34 is provided over lead 58 as one input to control gate 38 preferably comprising one portion of a Texas Instruments SN–7400 quad NAND circuit 86. The second input to gate circuit 38 is provided over lead 72 by the clock output of timing generator 40.

The output of gate circuit 38 is provided as the advance input to counter 42. This is comprised of 8421 BCD decade counter stages 88, 90, 92, and 94, preferably Texas Instruments type SN–7490. These counter stages are connected in series with the "8" output of one stage connected to the clock input of the succeeding stage as in the case of counter stages 64, 66, and 68 described in connection with FIG. 2. Thus, each stage operates as a divide by 10 circuit with 10 input pulses to a given stage being required to advance the succeeding stage by one count. Thus for every 1000 input pulses to stage 88, stages 90, 92, and 94 will register counts of 100, 10, and 1 respectively.

Counter circuit 42 also includes an inverting amplifier 95 and a binary divider comprising a toggling flip-flop 96. The latter is preferably formed by one-half of a dual D flip-flop, Texas Instruments Type SN–7474, generally denoted 97. The $\overline{Q}$ (complement) output of flip-flop 96 at terminal 6 is coupled directly to the D (data) input at terminal 2, thereby providing the toggling operation. The "8" output of decade stage 94 which goes high at the count of 8 and low at the count 10 is coupled through inverter 95 to provide a signal which is normally high and which goes low at the count of 8 and high again at the count of 10. [This, of course corresponds to counts of 8000 and 10000 respectively at the input of counter stage 88.] The output of inverter 95 is provided as the clock input of toggle flip-flop 96 at terminal 3. Also provided to flip-flop 96 at the preset input terminal 4, is the reset signal over lead 100 from timing generator 40.

For the type SN–7474 dual D flip-flop, a low input at the preset terminal forces the direct and complement outputs to "1" and "0" respectively, independent of the clock and data inputs. Flip-flop 96 is therefore set irrespective of its toggling action at the beginning of the low portion of the reset pulse as illustrated in FIG. 4 (c), and is held in this state until the reset pulse again goes high. Since the clock input at terminal 3 is responsive to a low to high transition, flip-flop toggles when the output of inverter 95 goes high, i.e., when counter stage 94 reaches a count of 10 corresponding to 10,000 input pulses for stage 88. As will be appreciated, with flip-flop 96 preset with its Q output at terminal 5 high at the beginning of a count interval, if stage 94 reaches a count of 10 during the count period, the Q output will go low at that time.

Returning to the operation of control gate 38, the count period established by the clock pulse on lead 72 is 10 milliseconds or 0.01 seconds. [See FIG. 4a.] Therefore the total count accumulated during a count interval is actually 0.01 times the actual frequency of the ADF local oscillator. Thus, if counter 42 registers a count of 10560, this actually corresponds to an operating frequency for local oscillator 24 of 1056 KHz.

It should be understood that the above count will be represented by counts of 1, 0, 5, and 6 stored in flip-flop 96, and decimal counter stages 94, 92, and 90. Stage 88 will register a count of zero, but even a non-zero count in this stage does not ever represent a significant figure of the frequency to be displayed since it corresponds to fractions of kilohertz. The output of this stage is employed in sensing the intermediate frequency of 142.5 KHz as explained below.

The data contained in stages 90, 92 and 94, and in flip-flop 96 is used to establish the read-out of the operating frequency. This is accomplished by data storage circuits 44, decoder 46, and four digit display 48. (See FIG. 1.)

As shown in detail in FIG. 3, data storage circuits 44 comprise a set of latching circuits. One-bit storage capacity is provided for each of the four bits of the outputs of counter stages 90, 92, 94, and for the output of flip-flop 96. The four latches required for decade stages 90 and 92 are provided by a single eight-bit latch 102, Texas Instruments type SN–74100. The four latches required for decade stage 94 are provided by a single four-bit latch circuit 104, Texas Instruments type SN–7475. The single latch for flip-flop 96 is provided by a second D type flip-flop 98 contained in dual flip-flop unit 97.

The first four-bit section of eight-bit latch circuit 102 receives data inputs at terminals 10, 11, 3, and 2 connected respectively to the 1, 2, 4, and 8 outputs of decade counter stage 90 at terminals 12, 9, 8, and 11 respectively. The corresponding four data outputs are provided at respective output terminals 9, 8, 4, and 5.

The four inputs for the second four-bit portion of eight-bit latch unit 102 are provided at terminals 16, 15, 21, and 22 by the 1, 2, 4, and 8 outputs of counter stage 92 at terminals 12, 9, 8, and 11 with respective outputs at terminals 17, 18, 20 and 19.

Four bit latch unit 104 has its four inputs provided at terminals 2, 7, 6, and 3 by the 1, 2, 4, and 8 outputs of counter stage 94 at terminals 12, 9, 8, and 11 respectively. The corresponding outputs are provided at terminals 16, 9, 10 and 15. Control inputs for latch circuits 102 and 104 are provided in common to terminal 12 and 23 of latch 102, and terminals 4 and 13 of latch 104 by the data transfer signal on lead 84.

As previously mentioned, the second flip-flop 98 of dual flip-flop 97 also provides a latching function. For this purpose, the D input at terminal 12 is coupled to the Q output of flip-flop 96 at terminal 5. The clock input at terminal 11 for the second stage is provided by data transfer signal over lead 84. Thus, in response to the low to high transition of the clock signal at terminal 11, the data present at the Q output of flip-flop 96 is transferred to flip-flop 98. The Q (complementary) output of flip-flop 98 is provided through an inverter - driver output circuit comprising a transistor 111 and related circuitry.

Latching circuits 102 and 104 and latching flip-flop 98 operate such that the outputs follow the respective data inputs when the control input is high and store the last data input when the control input goes low. Thus during the data transfer pulse [see FIG. 4b] the data accumulated in counter stages 90, 92 and 94 and in flip-flop 96 is transferred to latches 102 and 104, and flip-flop 98 for use by decoder 46 and display 48 hereinafter described.

FIG. 3 also illustrates the construction of off-set logic unit 50. The latter comprises an eight-input NAND circuit 112, a set-reset flip-flop 114 formed by a pair of cross-coupled NAND circuits 116 and 118, a timing circuit 120, and a further NAND circuit 122.

Eight-input NAND gate 112 operates to provide an output when the count accumulated in counter 42 reaches a predetermined value. For this purpose, five inputs for NAND gate 112 at respective terminals 1 through 4 and 12 are coupled to the "4" output of counter stage 92, the "2" output of counter stage 90, the "1" output of counter stage 88, the "4" output of stage 88, and the "1" output of stage 94. Three additional inputs at terminals 5, 6, and 11 are unneeded but are maintained at a high level to permit proper operation by hardwiring to the power supply.

To understand the operation of NAND circuit 112, it should be recalled that stage 88 counts each pulse provided by gate circuit 38. The latter operates only for a 0.01 second counting period and thus the count stored in stage 88 represents the hundreds digit for the actual frequency. Correspondingly, stages 90, 92 and 94 store the thousands, ten thousands and hundred thousands digits, respectively.

Stage 88 provides its "1" and "4" inputs to NAND gate 112; these are high when the stored count is "5", i.e., 500 Hz. For stages 90, 92 and 94, NAND gate 112 receives the "2", "4", and "1" outputs, corresponding respectively to 2KHz, 40 KHz, and 100 KHz. The inputs to NAND gate 112 are all high when the count stored in counter 42 is 142500 Hz, i.e., the intermediate frequency. Under these conditions, NAND gate operates and its output goes low.

The output of NAND gate 112 is provided over lead 124 to the set input of flip-flop 114, the reset input to which is provided over lead 52 by the reset signal from timing generator 40. The ONE output of flip-flop 114 is provided through an RC circuit to control the operation of timing circuit 120. The output of the latter is provided across a grounded collector resistor 128 as one input to NAND circuit 122, the other input to which is provided by the reset signal over lead 52.

Referring to FIG. 5, at the end of a counting cycle, the reset signal goes low causing flip-flop 114 to be reset and making the ONE output on lead 126 "0". The transistor 120 conducts and the input at terminal 10 for NAND gate 122 is high.

With the reset signal low, NAND gate 122 does not operate and its output at terminal 8 is high. This signal provided over lead 128 resets all of counter stages 88, 90, 92, and 94 maintaining the respective outputs at "0."

When the reset signal returns to its high level at the beginning of a count cycle, NAND gate 122 operates providing a low level on lead 128, freeing counters 88 through 94 to advance in response to the pulse outputs of gate circuit 38. Such operation continues until the count of 1425 is sensed by NAND gate 112.

At that time, the NAND gate operates and provide a low level on lead 124. This sets flip-flop 114, causing the signal on lead 126 to go high and producing a pulse at the base of transistor 120. This momentarily cuts the transistor off, and NAND gate 122 ceases to operate. The signal on lead 128 therefore goes high, again resetting counter 42 to its zero condition. When capacitor CO1 has charged to a level sufficient for transistor 120 again to conduct, NAND gate 122 again operates, its output goes low, and counter 42 is again permitted to advance.

As will be appreciated, NAND gate 112 will operate again if the count 1425 is reached again during the counting cycle. This, however, has no effect on counter 42 since flip-flop 114 has already been set, and remains set irrespective of further pulses on lead 124. NAND gate 122 is therefore disabled only once during each counting cycle.

During each cycle, therefore, counter accumulates a count of 1425.00, then is reset, then counts again to the end of the count period. The ultimate count therefore is 1425 below the actual count. In other words, the 1st 1425 pulses are subtracted away for each cycle. Since the local oscillator frequency is 142,500 Hz, the count in counter 42 at the end of the count period is exactly 0.01 times the incoming RF frequency to which the receiver is tuned.

The frequency measurement obtained in the manner described above is visually displayed by a four digit illuminated indicator, preferably formed of individual 7 bar-segment arrays such as illustrated in FIG. 5. These indicators are preferably light emitting diodes, commercially available in the required seven segment arrays. The individual segments labelled A – G are operated in various combinations as required to generate all of the digits 0–9. For example all of the segments A–G are required for the digit 8; two vertical segments, e.g., segments B and C, are employed for the digit 1.

Since the maximum frequency is just below 2000 KHz, the 10 digit capacity of the display element for the most significant digit is not required. In fact, only the digit "1" must be displayed since the most significant zero may be suppressed. For this reason, the output of latch flip-flop 98 is connected directly through inverter driver 11 to the B and C segments of the display element corresponding to the most significant digit.

For the remaining three display elements, there are provided respective BCD to seven segment decoders, 106, 108, and 110, preferably Texas Instruments type SN-7446. These operate in a conventional manner to convert the 8421 BCD codes provided by respective latch circuits 102 (two four-bit sections) and 104 to the format required by the display. Each decoder has seven outputs connected to the A–G segments of the associated display element. Operation is conventional, and no further description of this portion of the system is deemed necessary.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims and therefore intended to be embraced therein.

What is claimed and desired to be secured by United States Letters Patent is:

1. A tuning indicator for an ADF system including a local oscillator adapted to be tuned to a frequency upwardly off-set by a predetermined amount from the frequency to be received, said indicator comprising; timing means, means for counting the number of cycles of the local oscillator output during a predetermined period; display means coupled to said counting means to provide a digital read-out of said stored count; and off-set logic means connected to said counting means and responsive to accumulation of a count corresponding to said upward off-set at the beginning of a count period to reset said counting means to a count of zero.

2. A tuning indicator for an ADF system including a local oscillator adapted to be tuned to a frequency upwardly off-set by a predetermined amount from the frequency to be received, said indicator comprising: timing means for establishing an operating cycle comprising a count period followed by a display period; means for counting the number of cycles of the local oscillator output during said count period; temporary storage means coupled to said counting means and said timing means, said temporary storage means being operative at the beginning of said display period to store a representation of the count contained in said counting means at the end of the immediately preceeding count period; display means coupled to said temporary storage means to provide a digital read-out of said stored count; and off-set logic means connected to said counting means and responsive to accumulation of a count corresponding to said upward off-set at the beginning of a count period to reset said counting means to a count of zero.

3. An indicator as defined in claim 2 wherein said upward off-set equals 142.5 KHz and wherein said operating cycle is of 20 millisecond duration, with a 10 millisecond count period immediately followed by a 10 millisecond display period.

4. An indicator according to claim 2 wherein said display means comprises a plurality of seven bar segment illuminated indicators.

5. An indicator according to claim 4 wherein said data stored in said temporary storage means is in a binary coded decimal format and wherein said display means includes decoder means for converting said binary coded decimal format to the seven segment code format for each decimal digit to be displayed.

6. An indicator according to claim 2 wherein said off-set logic comprises means responsive to accumulation of said off-set count to generate a control pulse; bistable circuit means, said bistable circuit means being operative in response to said control pulse to switch from a first to a second state; means responsive to establishment of said second binary circuit state for returning said counting means to a count of zero; and further including means in said timing means to generate a reset signal at the end of said display period, said bistable circuit means being responsive to said reset signal to switch from said second to said first state.

7. An indicator according to claim 6 further including means responsive to said reset signal to return said counter to a count of zero irrespective of the state of said bistable circuit means.

8. An indicator according to claim 2 wherein said timing means comprises primary clock means for generating a high frequency pulse train; divider means coupled to said clock means to generate a low frequency square wave, the first and second half cycles of said squarewave representing said counting period, and the display period respectively of said operating cycle; first logic means responsive to the beginning of said second half cycle to generate a first control signal of duration less than the duration of said second half cycle; second logic means responsive to completion of a predetermined portion of said second half cycle longer than the duration of said first control signal to generate a second control signal continuing to the end of said second half cycle; means responsive to said first control signal to operate said temporary storage means; and means responsive to said second control signal to return said counting means to a count of "0".

9. An indicator according to claim 8 wherein said first and second logic means each comprise combinational logic elements coupled to said divider means.

10. An indicator according to claim 2 wherein said counting means comprises a plurality of series connected decade counter stages, each stage providing a binary coded decimal signal output representative of the count state thereof; and further including gating means coupled to the output of said local oscillator and responsive to establishment of said counting period to couple said local oscillator output to the input of said first decade counter stage;

11. An indicator according to claim 10 further including a one bit binary counter coupled to the output of the last of said series connected decade counter stages.

12. An indicator according to claim 11 wherein said temporary storage means comprises a first group of multiple bit latching circuits, each of said latching circuits being connected to the output of one of said decade counter stages, and a further single bit latching circuit connected to the output of said binary counter stage, said latching circuits being operative at the beginning of the display period of each operating cycle to store the count then present in the respective decade and binary counter stages.

13. An indicator according to claim 12 wherein said timing means comprises primary clock means for generating a high frequency pulse train; divider means coupled to said clock means to generate a low frequency squarewave, the first and second half cycles of said square-wave representing said counting period, and the display period respectively of said operating cycle; means coupling said squarewave to control said gating means; first logic means responsive to the beginning of said second half cycle to generate a first control signal of duration less than the duration of said second half cycle; second logic means responsive to completion of a predetermined portion of said second half cycle longer than the duration of said first control signal to generate a second control signal continuing to the end of said second half cycle; means responsive to said first control signal to actuate said latching means to store the count in said decade counter stages at that time, and means responsive to said second control signal to reset said decade counting stages and said one bit binary counter.

14. An indicator according to claim 13 wherein said display means comprises a plurality of seven bar-segment display elements, one of said display elements being associated with each of said latching circuits; a plurality of binary coded decimal to seven segment decoders, each respectively coupling one of said four-bit latching circuits to the associated display element, and further means coupling the output of said one-bit latching circuit to another of said seven bar segment display elements.

15. An indicator according to claim 12 wherein the number of latching circuits is less than the number of decade counter stages.

* * * * *

UNITED STATES PATENT OFFICE
CERTIFICATE OF CORRECTION

Patent No. 3,681,707      Dated August 1, 1972

Inventor(s) STEPHEN F. BEAN

It is certified that error appears in the above-identified patent and that said Letters Patent are hereby corrected as shown below:

In the Abstract, line 4, "modify" should read --to modify--.

In Column 3, line 43, "for" should read --from--.

In Column 7, line 32, "terminal" should read --terminals--.

In Column 9, line 53, "claims and" should read --claims are--.

In Column 11, line 16, Claim 10, "stage;" should read --stage.--.

Signed and sealed this 6th day of February 1973.

(SEAL)
Attest:

EDWARD M. FLETCHER, JR.
Attesting Officer

ROBERT GOTTSCHALK
Commissioner of Patents